(12) United States Patent
Sharifi et al.

(10) Patent No.: US 9,224,118 B2
(45) Date of Patent: Dec. 29, 2015

(54) DYNAMIC DISPLAY OF CONTENT CONSUMPTION BY GEOGRAPHIC LOCATION

(75) Inventors: Matthew Sharifi, Zurich (CH); Annie Chen, Thalwil (CH); Dominik Roblek, Mountain View, CA (US)

(73) Assignee: GOOGLE INC., Mountain View, CA (US)

( * ) Notice: Subject to any disclaimer, the term of this patent is extended or adjusted under 35 U.S.C. 154(b) by 149 days.

(21) Appl. No.: 13/417,598

(22) Filed: Mar. 12, 2012

(65) Prior Publication Data

US 2013/0235027 A1    Sep. 12, 2013

(51) Int. Cl.
| | | |
|---|---|---|
| G06Q 10/06 | (2012.01) | |
| G09B 29/00 | (2006.01) | |
| G06F 17/30 | (2006.01) | |

(52) U.S. Cl.
CPC .......... *G06Q 10/0637* (2013.01); *G09B 29/006* (2013.01); *G09B 29/007* (2013.01); *G06F 17/30817* (2013.01)

(58) Field of Classification Search
None
See application file for complete search history.

(56) References Cited

U.S. PATENT DOCUMENTS

| | | | |
|---|---|---|---|
| 8,090,621 B1* | 1/2012 | Chakrabarti et al. ........ 705/26.1 |
| 8,151,194 B1* | 4/2012 | Chan et al. .................... 715/716 |
| 8,156,132 B1* | 4/2012 | Kaminski, Jr. ................ 707/758 |
| 2008/0086356 A1 | 4/2008 | Glassman et al. |
| 2008/0195664 A1 | 8/2008 | Maharajh et al. |
| 2009/0210388 A1* | 8/2009 | Elson et al. ........................ 707/3 |
| 2010/0287178 A1 | 11/2010 | Lambert et al. |
| 2011/0173218 A1* | 7/2011 | Paknad et al. ................. 707/769 |
| 2011/0208616 A1 | 8/2011 | Gorman et al. |
| 2011/0208724 A1* | 8/2011 | Jones et al. .................... 707/723 |
| 2011/0276534 A1* | 11/2011 | Ubalde et al. ................. 707/600 |
| 2011/0283322 A1 | 11/2011 | Hamano |
| 2012/0208592 A1* | 8/2012 | Davis et al. ................ 455/556.1 |
| 2013/0073584 A1* | 3/2013 | Kuper et al. .................. 707/769 |
| 2013/0117284 A1* | 5/2013 | Roozen et al. ................ 707/748 |

FOREIGN PATENT DOCUMENTS

EP    2196976    6/2010

OTHER PUBLICATIONS

International Search Report and Written Opinion of the International Searching Authority for International Application No. PCT/US2013/030298, dated May 28, 2013, 14 pages.

\* cited by examiner

*Primary Examiner* — Xiao Wu
*Assistant Examiner* — Steven Elbinger
(74) *Attorney, Agent, or Firm* — Lowenstein Sandler LLP

(57) ABSTRACT

This disclosure relates to dynamic display of content consumption by geographic location. A recognition component recognizes content being consumed by a set of users, and identifies geographic locations of the consumption and a set of characteristics associated with the consumption. An aggregation component ranks the consumed content based on a subset of the characteristics associated with the consumption, and a display component generates a map displaying subsets of the consumed content as a function of respective rankings and geographic location.

23 Claims, 11 Drawing Sheets

DYNAMIC DISPLAY OF CONTENT CONSUMPTION BY GEOGRAPHIC LOCATION

TECHNICAL FIELD

This disclosure generally relates to systems and methods that facilitate dynamically displaying content consumption by geographic location.

BACKGROUND

Computing technology and the Internet have fundamentally changed the processes of disseminating and consuming information. Hundreds of millions of people around the world have access to multiple means of accessing and consuming a vast array of information at virtually any time. For instance, users can listen to songs using a portable music player, watch television shows or videos using mobile devices, or read newspaper articles from around the globe via an electronic reader. In addition, newer and more efficient means of consuming and disseminating information are constantly being generated.

The sheer quantity of information options available to users can make selecting information for consumption challenging. Popular online services can receive tens of hours worth of newly uploaded user-generated content every minute. A technique that has been commonly employed to assist users in identifying information for consumption includes ranking information based on quantities of consumption or user rankings. This allows users to select content that has been consumed by a large number of users in the past, or that a large number of users have previously ranked highly.

However, based on the large quantity of information available, reliance on the ratings and viewership of past users can still result in a relatively large number of information options. In addition, identifying information for consumption based on other users' past opinions may only be marginally helpful with regard to assisting a current user in selecting information for consumption, and can fail to capitalize on quickly changing information consumption trends.

SUMMARY

The following presents a simplified summary of the specification in order to provide a basic understanding of some aspects of the specification. This summary is not an extensive overview of the specification. It is intended to neither identify key or critical elements of the specification nor delineate any scope of particular embodiments of the specification, or any scope of the claims. Its sole purpose is to present some concepts of the specification in a simplified form as a prelude to the more detailed description that is presented later.

According to an aspect of the subject innovation, systems and methods for dynamic display of content consumption by geographic location are disclosed. A content consumption component includes a recognition component that recognizes content being consumed by a set of users, and identifies geographic locations of the consumption and a set of characteristics associated with the consumption. An aggregation component ranks the consumed content based on a subset of the characteristics associated with the consumption, and a display component generates a map displaying subsets of the consumed content as a function of respective rankings and geographic location.

In an embodiment, a method is provided that includes recognizing content being consumed by a set of users, identifying a geographic location associated with the content being consumed and a set of content consumption characteristics, ranking respective consumed content as a function of a subset of the content consumption characteristics, and generating a map displaying subsets of the consumed content as a function of respective rankings and geographic location.

The following description and the annexed drawings set forth certain illustrative aspects of the specification. These aspects are indicative, however, of but a few of the various ways in which the principles of the specification may be employed. Other advantages and novel features of the specification will become apparent from the following detailed description of the specification when considered in conjunction with the drawings.

DETAILED DESCRIPTION

Overview

Figure 1:
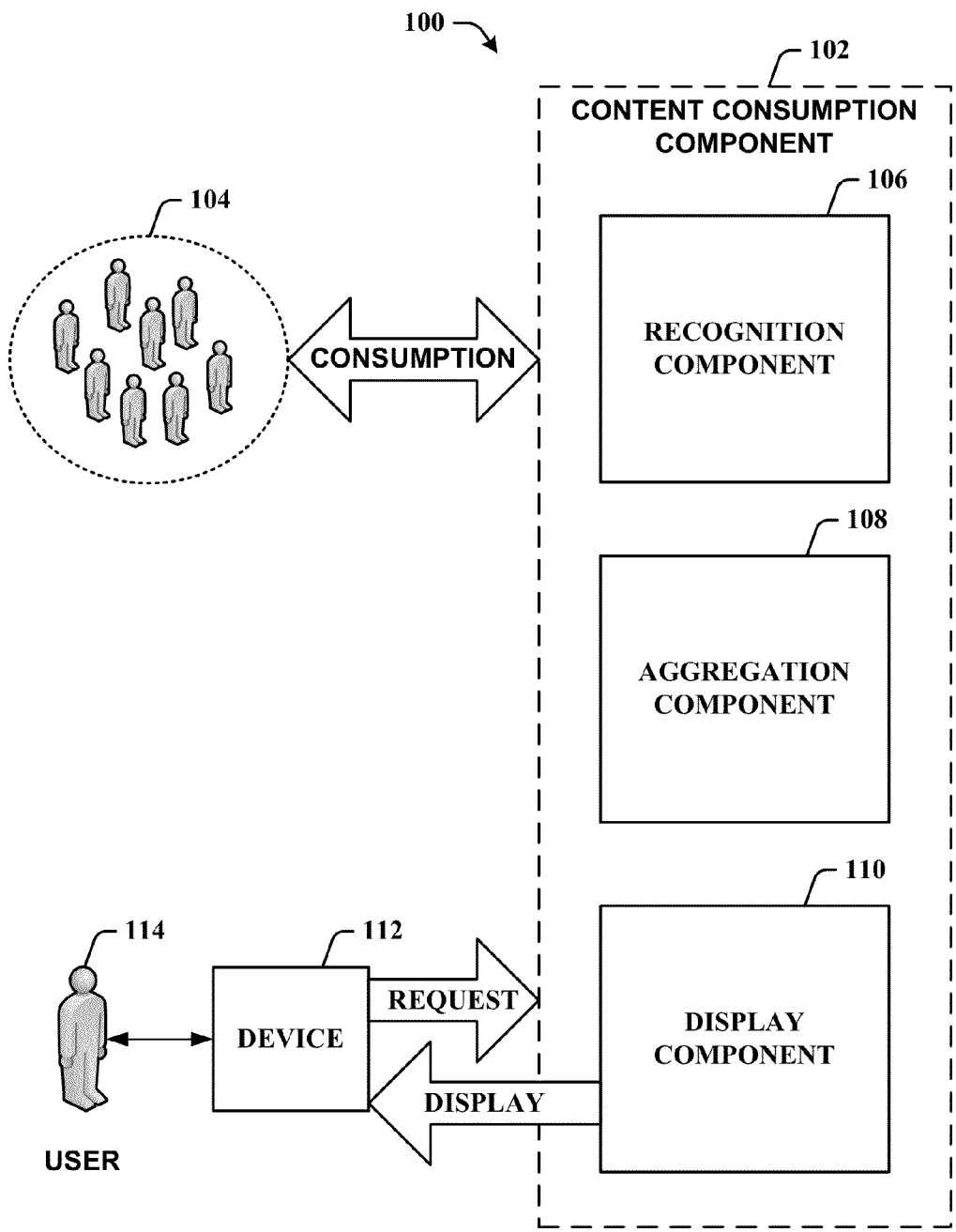
FIG. 1 illustrates an example system for dynamic display of content consumption by geographic location in accordance with various aspects described in this disclosure.

The innovation is now described with reference to the drawings, wherein like reference numerals are used to refer to like elements throughout. In the following description, for purposes of explanation, numerous specific details are set forth in order to provide a thorough understanding of this innovation. It may be evident, however, that the innovation can be practiced without these specific details. In other instances, well-known structures and devices are shown in block diagram form in order to facilitate describing the innovation.

As noted in the Background section, techniques that assist users in identifying information or content for consumption that include ranking information based on quantities of consumption or user rankings may only be partially helpful with regard to assisting a current user in selecting information for consumption, and can fail to capitalize on quickly changing information consumption trends.

In one non-limiting implementation of this disclosure, a dynamic and straightforward display of information consumption is provided. The implementation provides users a map that dynamically displays and identifies quickly changing information consumption trends based on geographic locations, and sets of consumption characteristics. In addition, the user can adjust the display, locations, or consumption to characteristics to provide a personalized information experience.

More particularly, in accordance with one embodiment, a content consumption component includes: a recognition component that recognizes content being consumed by a set of users, and identifies geographic locations of consumption and a set of consumption characteristics; an aggregation component that ranks respective consumed content as a function of a subset of the consumption characteristics; and a display component that generates a map displaying subsets of the consumed content as a function of respective rankings and geographic location.

Non-Limiting Examples of Dynamic Display of Content Consumption by Geographic Location Turning now to FIG. 1, illustrated is an example system 100 for dynamic display of content consumption by geographic location in accordance with various aspects described in this disclosure. Generally, system 100 can include a memory that stores computer executable components and a processor that executes computer executable components stored in the memory, examples of which can be found with reference to FIG. 10. System 100 includes a content consumption component 102. The content consumption component 102 recognizes consumption of content by a set of users 104, and generates a map displaying, by location, the content consumption as a function of a set of characteristics of the consumption (consumption characteristics). The content consumption component 102 includes a recognition component 106, an aggregation component 108, and a display component 110.

The recognition component 106 identifies, examines or otherwise recognizes consumption of content by the set of users 104 who have permitted their consumption, or a subset thereof, to be identified, examined or otherwise recognized. The content can include, but is not limited to, songs, movies, television shows, internet videos, websites, video games, applications, online articles, electronic books (e-books), or online searches. The set of users 104 can employ virtually any content enabled device to recognize consumed content and/or consume content, including, but not limited to, a smart phone, a cell phone, a personal digital assistant (PDA), a tablet, a laptop, a desktop, a portable music player, a video game system, an electronic reader (e-reader), a television, and so forth. For example, in one implementation, a user in the set of users 104 can listen to (e.g., consume) a song by a first musical group via a portable music player, and the recognition component 106 can recognize the user's consumption of the song, as permitted by the user. As an additional or alternative example, the device can include one or more sensors (e.g., microphones, cameras, speakers, etc.), and the recognition component 106 can recognize content being consumed on a different device based on, for example, ambient sounds detected using the sensors, as permitted by the user. For instance, a user in the set of users 104 can execute an audio recognition application associated with the recognition component 106 on the device that uses the sensors to capture audio associated with a television show being consumed by the user 104 via a television. The audio recognition application can send, transmit, or otherwise provide the audio, or a fingerprint of the audio, to the recognition component 106. The recognition component 106 can compare the audio or fingerprint to audio or fingerprints for known television shows, and identify the television show consumed by the user 114 based on the comparison (discussed in greater detail with reference to FIG. 2).

In addition, the recognition component 106 can recognize, identify, or otherwise determine a geographic location of the consumption, and a set of consumption characteristics, as permitted by the user. The set of consumption characteristics can include virtually any data related to users in the set of users 104, or the consumption of the content by the set of users 104. For example, the recognition component 106 can determine a device used to consume the content, an application used to consume the content, demographic information associated with users, and so forth, as permitted by the users. In one embodiment, the recognition component 106 notifies users in the set of users 104 of the types of information that are recognized by, stored by, and/or transmitted to or from the content consumption component 102, and provides the user the opportunity to opt-in or out of having such information recognized by, stored by, and/or transmitted to or from the content consumption component 102.

The aggregation component 108 grades, categorizes, or otherwise ranks respective consumed content as a function of a subset of the consumption characteristics. For example, the aggregation component 108 can rank songs consumed by the set of users 104 as a function of percentages of consumption for the respective songs. For instance, if a first song is consumed by 45% of the set of users 104, and a second song is consumed by 11% of the set of users 104, then the aggregation component 108 can rank the first song ahead of, or higher than, the second song based on the first and second songs' respective percentages of consumption (e.g., 45% and 10%).

The display component 110 generates, produces, transmits or otherwise provides a map displaying subsets of the consumed content as a function of the rankings (grades, categorizations, etc.). In one non-limiting embodiment, the display component 110 generates a map displaying a subset of consumed content as a function of respective rankings and geographic location. For example, the display component 110 can generate a map displaying the most popular (e.g., highest ranked or highest consumption percentage) internet videos by location.

The display is provided to a user 114 via a device 112. It is to be appreciated that the user 114 can be a member of the set of users 104, or a disparate user. The user 114 is authorized to view the consumption data, e.g., by the users in the set of users. Typically, the data displayed on the map is anonymized. In one implementation, the users of the set of users are part of a study, survey, beta test or family or social circle, and have granted permission to the user 114 to view their specific data. The user 114 can send or otherwise provide a request regarding consumption of content in a set of geographic areas to the content consumption component 102. The request can include a set of user preferences (discussed in greater detail with reference to FIG. 3). It is to be appreciated that although the content consumption component 102 is illustrated as being a stand-alone component, such implementation is not so limited. For instance, the content consumption component 102 can be included in a device (e.g., device 112), an application, or integrated with an online service that provides content to users (e.g., the set of users 104).

Figure 2:
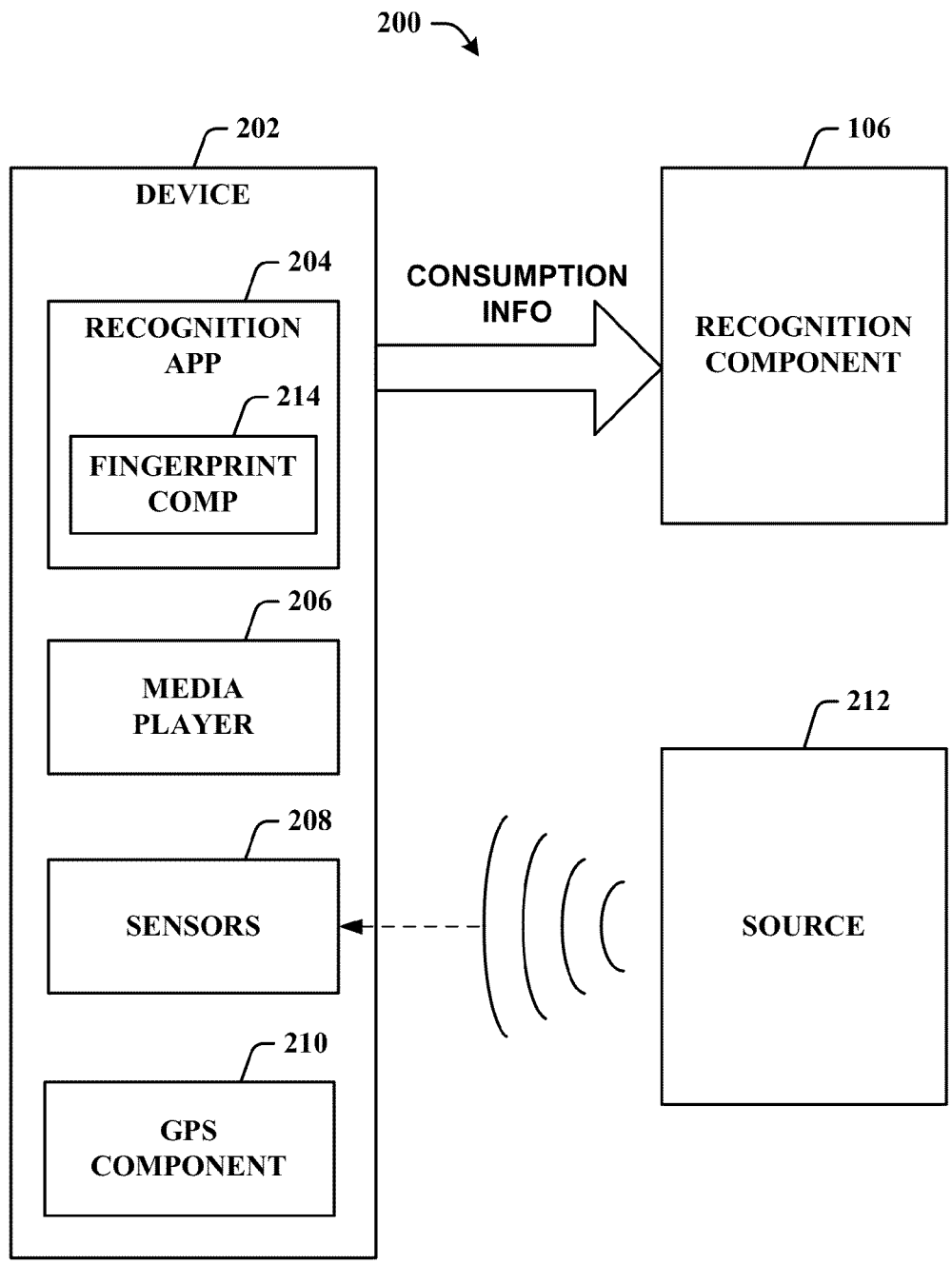
FIG. 2 illustrates an example system for dynamic display of content consumption by geographic location in accordance with various aspects described in this disclosure.

FIG. 2 illustrates an example system 200 for dynamic display of content consumption by geographic location in accordance with various aspects described in this disclosure.

As discussed, a user in the set of users 114 can use a device, e.g., device 202, to recognize consumed content and/or consume content. The device 202 can include virtually any content enabled device, including but not limited to a smart phone, a cell phone, a personal digital assistant (PDA), a tablet, a laptop, a desktop, a portable music player, a video game system, an electronic reader (e-reader), a television, and so forth. The content can include but is not limited to songs, movies, television shows, internet videos, websites, video games, applications, online articles, electronic books (e-books), or online searches.

The device 202 includes a recognition application 204 (recognition app 204), a media player 206, a set of sensors 208, and a global positioning system component 210 (GPS component 210). The recognition app 204 detects, acquires, or otherwise captures content, or a portion of content, being consumed from a source 212 using the set of sensors 208, as permitted by the user. The set of sensors 208 include but are not limited to microphones, cameras, and/or speakers. The source 212 can include virtually any device capable of playing or presenting content, including but not limited to audio players, video displays, and/or computers. For example, the user can execute the recognition app 204 on the device 202 to recognize a song playing on a juke box (e.g., source 212) in a pub. The recognition app 204 can capture a portion of the song using a microphone included in the set of sensors 208.

The device 202 provides, sends, or otherwise communicates data regarding content consumption (consumption info) to the recognition component 106. For example, in one implementation, the device 202 provides the content captured by the recognition app 204 to the recognition component 106. As an additional or alternative example, in one implementation, the recognition app 204 includes a fingerprint component 214 that generates a fingerprint of the captured content. The fingerprint can include but is not limited to a hash value or a histogram generated based on the content. The recognition component 204 identifies the content based on the content or fingerprint received from the device 202 (discussed in greater detail with reference to FIG. 3).

Additionally or alternatively, the user can consume content using the device 202. For example, in one implementation, the user can consume content via the media player 206 included in the device. The media player 206 enables consumption of content maintained on the device 202, or streaming of content from a content server. For example, the user can play a set of songs maintained on the device 202 using the media player 206. As discussed, the device 202 communicates data regarding content consumption (consumption info) to the recognition component 106. The consumption info can include but is not limited to metadata associated with content consumed using the media player 206 to the recognition component 106.

The GPS component 210 determines a geographic location of the device 202 via a global positioning system, and provides the geographic location to the recognition component 106, as permitted by the user. For example, in one implementation, location data including the geographic location of the device 202 determined by the GPS component 210 is included in the consumption information provided to the recognition component 106. It is to be appreciated that although the recognition component 106 is illustrated as being a stand-alone component, such implementation is not so limited. For instance, the recognition component 106 can be included in the device 202, a server, an application, or integrated with an online service that provides content to users.

Figure 3:
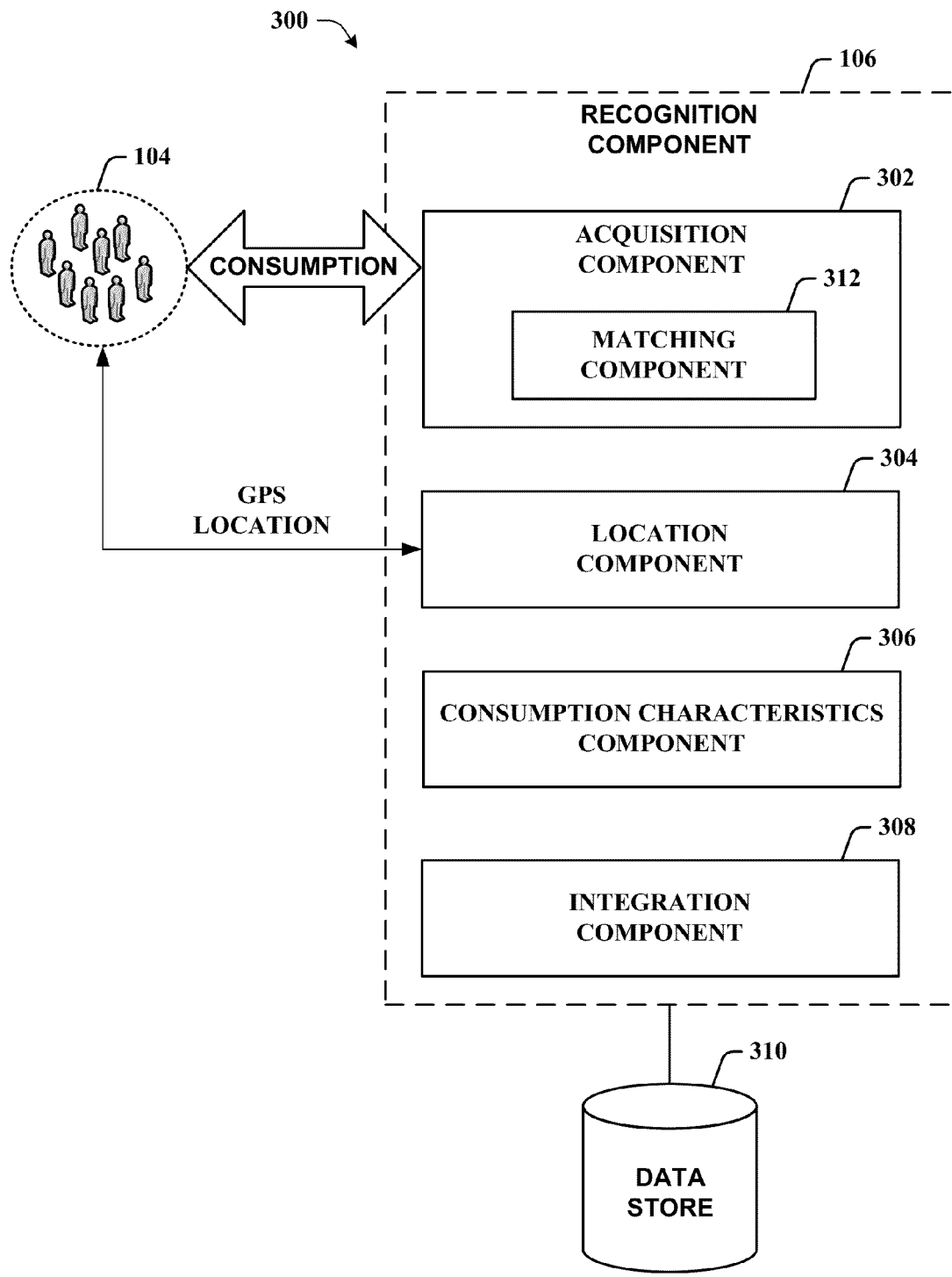
FIG. 3 illustrates an example recognition component in accordance with various aspects described in this disclosure.

FIG. 3 illustrates an example recognition component 106 in accordance with various aspects described in this disclosure. As discussed, the recognition component 106 recognizes consumption of content by the set of users 104, a geographic location of the consumption, and a set of consumption characteristics associated with the set of users 104 or the consumption of the content by the set of users 104, as permitted by the users. The recognition component 106 in FIG. 3 includes an acquisition component 302, a location component 304, a consumption characteristics component 306, and an integration component 308. The acquisition component 302 receives, obtains, or otherwise acquires data regarding the consumption of content (e.g., consumption info) by users in the set of users 104. For example, in one embodiment, the acquisition component 302 can acquire data regarding a movie (e.g., metadata) that a user in the set of users 104 is watching on a device associated with the user (e.g., device 202).

As an additional or alternative example, in one embodiment, the acquisition component 302 receives consumed content (e.g., captured using the recognition app 204) or a fingerprint of consumed content (e.g., generated using the fingerprint component 214) from the device associated with the user. The acquisition component 302 includes a matching component 312 that matches the consumed content or fingerprints of consumed content with known content based on a set of identification criteria. The identification criteria includes but is not limited to exceeding a matching threshold. For example, the acquisition component 302 can receive a fingerprint for a song, compare the fingerprint to a set of fingerprints for known songs, and identify the consumed song as a known song having a fingerprint that exceeds the predetermined matching threshold. The known content or fingerprints of known content can be maintained, for example, in the data store 310.

The location component 304 ascertains, identifies, or otherwise determines a geographic location of the content consumption or user, as permitted by the user. For example, in one embodiment, where the user has enabled or allowed GPS location pinpointing, the location component 304 can determine the location of the user via a GPS enabled device employed to consume the content (e.g., a mobile phone or tablet personal computer), or obtain the geographic location from the GPS enabled device. For instance, the geographic location of the device can be included in the data obtained by the acquisition component 302 regarding consumption of content. As an additional or alternative example, the location component 304 can determine a location associated with a profile or account of a user if so permitted, or based on an internet protocol address (IP address) associated with the device. For instance, the location component 304 can acquire the location information (e.g., via the account or profile) from the data store 310.

The consumption characteristics component 306 (characteristics component 306) acquires, locates, or otherwise determines consumption characteristics based on the data regarding the consumption of content obtained by the acquisition component 302. For example, the characteristics component 306 can acquire demographic data for the user from a profile, or account, associated with the user maintained in the data store 310, if so permitted. For instance, if a first user is reading (e.g., consuming) an article from an online service, the characteristics component 306 can acquire demographic data (e.g., age, gender, education, etc.) relating to the user maintained in a profile for the online service from the data store 310, if so permitted by the user. In addition, the characteristics component 306 can obtain data relating to the consumed content, such as classifications, user ratings, and so forth from the data store 310. For example, the characteristics component 306 can obtain a categorization (e.g., country, classical, hip hop, pop, etc.) for a consumed song from the data store 310. It is to be appreciated that although the data store 310 is illustrated as being associated with the recognition component 106, such implementation is not so limited. For instance, the data store 310 can be associated with a disparate content service or website, and the recognition component 106 can communicate with the data store 310 via a network connection. Further, the data store 310 may include any number of storage units.

The integration component 308 provides various adapters, connectors, channels, communication paths, etc. to integrate the recognition component 106 into an operating and/or database system(s). In addition, the integration component 308 can provide various adapters, connectors, channels, communication paths, etc., that provide for interaction with devices (e.g., device 202) employed by the set of users 104. It is to be appreciated that although the integration component 308 is illustrated as incorporated into the recognition component 106, such implementation is not so limited. For instance, the integration component 308 can be a stand-alone component to receive or transmit data in relation to the content consumption component 102. In particular, the integration component 308 can receive virtually any data relating to content consumed by a user in the set of users 104, a device that is associated with a user, or data relating the set of users 104, as permitted.

Figure 4:
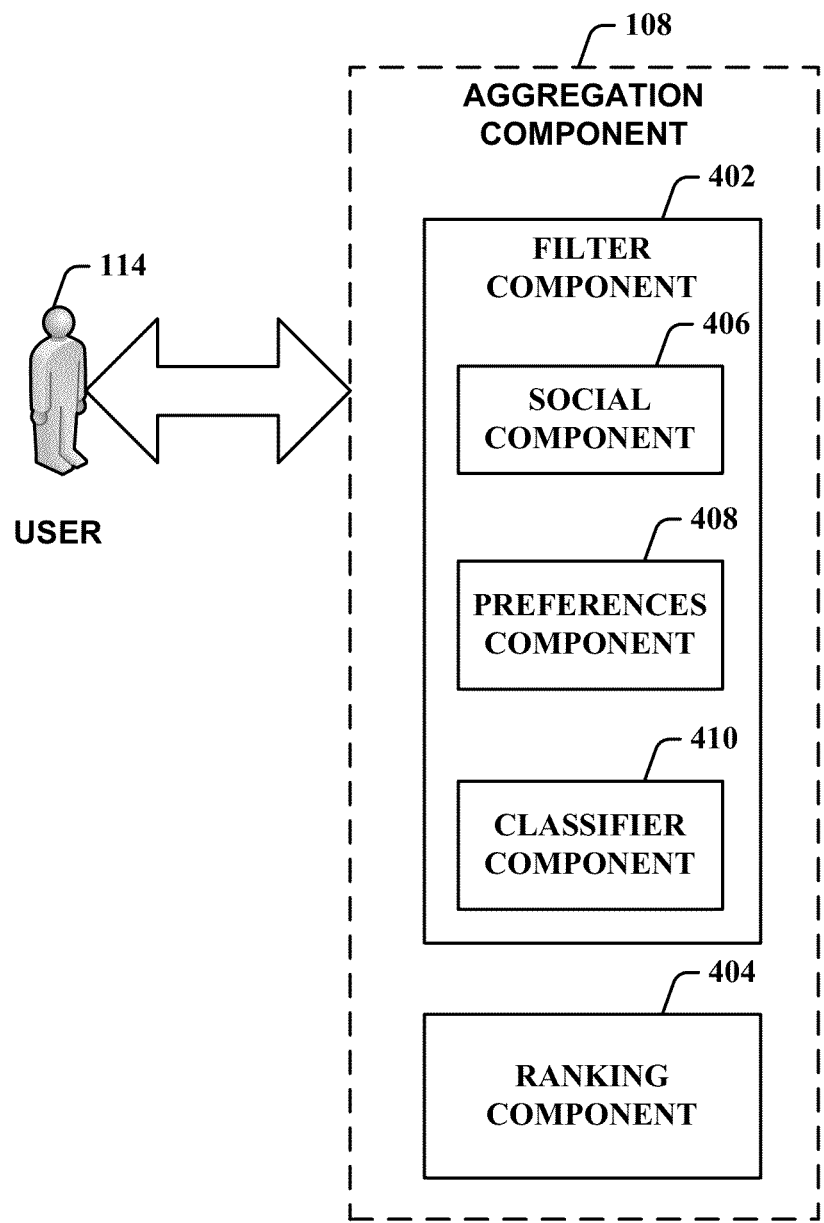
FIG. 4 illustrates an example aggregation component in accordance with various aspects described in this disclosure.

Referring to FIG. 4, illustrated is an example aggregation component 108 in accordance with various aspects described in this disclosure. As discussed, the aggregation component 108 ranks respective consumed content as a function of a subset of consumption characteristics. The aggregation component 108 in FIG. 4 includes a filter component 402, and a ranking component 404. The filter component 402 sorts, separates, or otherwise filters consumed content to be ranked, or consumption characteristics to be employed in ranking the consumed content, based at least in part on a set of filter criteria. The filter criteria can include virtually any criteria associated with content consumers (e.g., set of users 104) or the consumed content as may be available based on data made available and permissions granted. For example, the filter criteria can include locations of consumption, a frequency of consumption threshold, devices used to consume content, applications used to consume content, times of content consumption, demographic information associated with content consumers, and so forth.

The filter component 402 includes a social component 406, a preferences component 408, and a classifier component 410. The social component 406 enables the content consumption component 102 to obtain information regarding content consumption by individual users that have enabled sharing content consumption with the user 114. For example, a friend of the user 114 may desire to share their content consumption or a subset of content consumption (e.g., songs played, movies watched, articles read, etc.) with the user 114, and the social component 406 enables sharing of said content consumption. The filter criteria can include a set of users that have enabled sharing of content consumption with the user 114. In addition, the social component 406 can provide for sharing filter criteria with other users. For example, the user 114 can obtain a set of filter criteria employed by a friend or their favorite actor to rank consumed content, or the user 114 can share their filter criteria with other users.

The preferences component 408 provides for a user 114 to create, set, or otherwise determine a set of user preferences for filtering consumed content for ranking, and/or a subset of consumption characteristics employed in ranking the consumed content. For example, the user 114 can set a default user preference to rank content having a predetermined classification (e.g., country songs, horror movies, etc.) as a function of consumption percentage for a set of users in a predetermined location (e.g., United States, Japan, etc.). As an additional example, the user 114 can set a user preference that defines a set of social networking friends (e.g., other users) for whom the user desires to display consumption as a function of frequency of consumption. The user preferences can relate to virtually any option available for displaying or ranking content consumption, and the filter criteria can be based at least in part on the user preferences.

The classifier component 410 determines or infers filter criteria for consumed content to be ranked, or consumption characteristics to be employed in ranking the consumed content. For example, the classifier component 410 can infer of determine a set of filter criteria based in part on social correlations. The classifier component 410 can employ, for example, a naïve Bayes classifier, a Hidden Markov Model (HMM), a support vector machine (SVM), a Bayesian network, a decision tree, a neural network, a fuzzy logic model, a probabilistic classifier, and so forth. The classifier is trained using a set of training data. For example, the set of training data can include consumption characteristics for others users associated with the user 114 (e.g. friends identified by the user), or filters employed by the other users, as permitted by those friends and other users.

The ranking component 404 classifies, orders, or otherwise ranks a subset of respective consumed content (e.g., filtered consumed content) as a function of a subset of consumption characteristics (e.g., filtered consumption characteristics). For example, the filter criteria can include a filter for a type of consumed content, such as e-books, a filter for a type of e-book, such as mystery novels, and a set of filters for consumption characteristics, such as consumption percentage and a location (e.g., Silicon Valley). The ranking component 404 can rank e-books classified as mystery novels based on consumption percentage by users located in Silicon Valley in the set of users 104.

Figure 5:
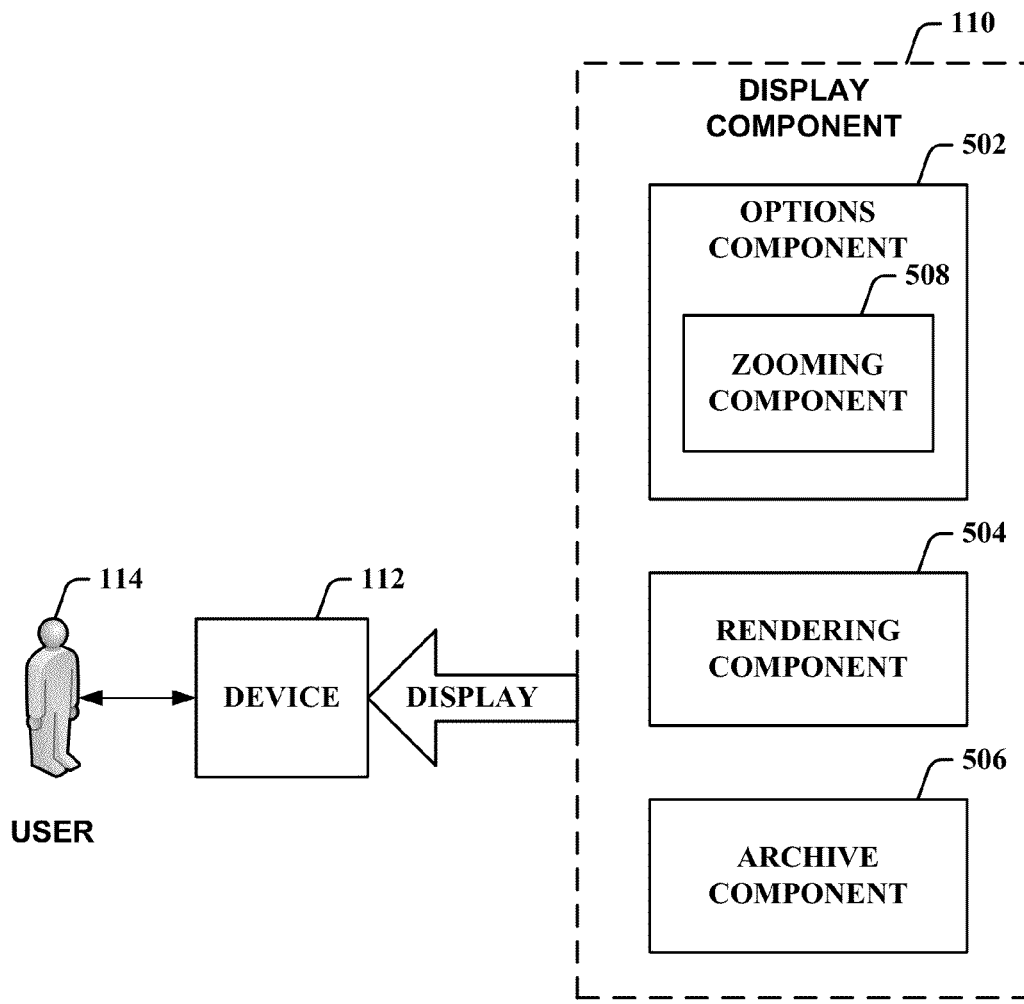
FIG. 5 illustrates an example display component in accordance with various aspects described in this disclosure.

FIG. 5 illustrates an example display component 110 in accordance with various aspects described in this disclosure. As discussed, the display component generates a map displaying subsets of consumed content as a function of respective rankings and geographic location. The display component 110 in FIG. 5 includes an options component 502, a rendering component 504, and an archive component 506. The options component 502 provides for a user to set, select, or otherwise determine a set of display options. The options component 502 includes a zooming component 508 that provides for setting, adjusting, or otherwise determining a granularity displayed of the consumed content. The granularity displayed can include a globe, a continent, a country, a region, a state, a city, a subset set of users, and so forth. For example, the display component 110 can generate a map of the United States displaying consumed content as a function of consumption percentage by region (e.g., granularity). The user 114 can adjust the granularity displayed, by zooming in at a region, and content consumption can be displayed on the zoomed map as a function of a consumption percentage by states in the region.

The rendering component 504 renders, displays, or otherwise generates the display map as a function of the rendering capabilities of a device 112 employed by the user 114. For example, the device 112 can be a smart phone or tablet, wherein the device 112 may have a screen that is smaller than a screen for a desktop computer, and the rendering component 504 can render a custom map based on the capabilities of the device 112 (e.g., smart phone or tablet). The archive component 506 can archive or maintain historical maps of content consumption. For example, the user 114 may desire to see the most popular songs by region a year ago. Additionally or alternatively, the historical maps maintained by the archive component 506 can be used to determine, and display, the change (e.g., delta) in consumption for subsets of consumed content over a period of time. For example, the user 114 may desire to generate a display of how the popularity of an e-book has increased over a period of time in a region.

Figure 6:
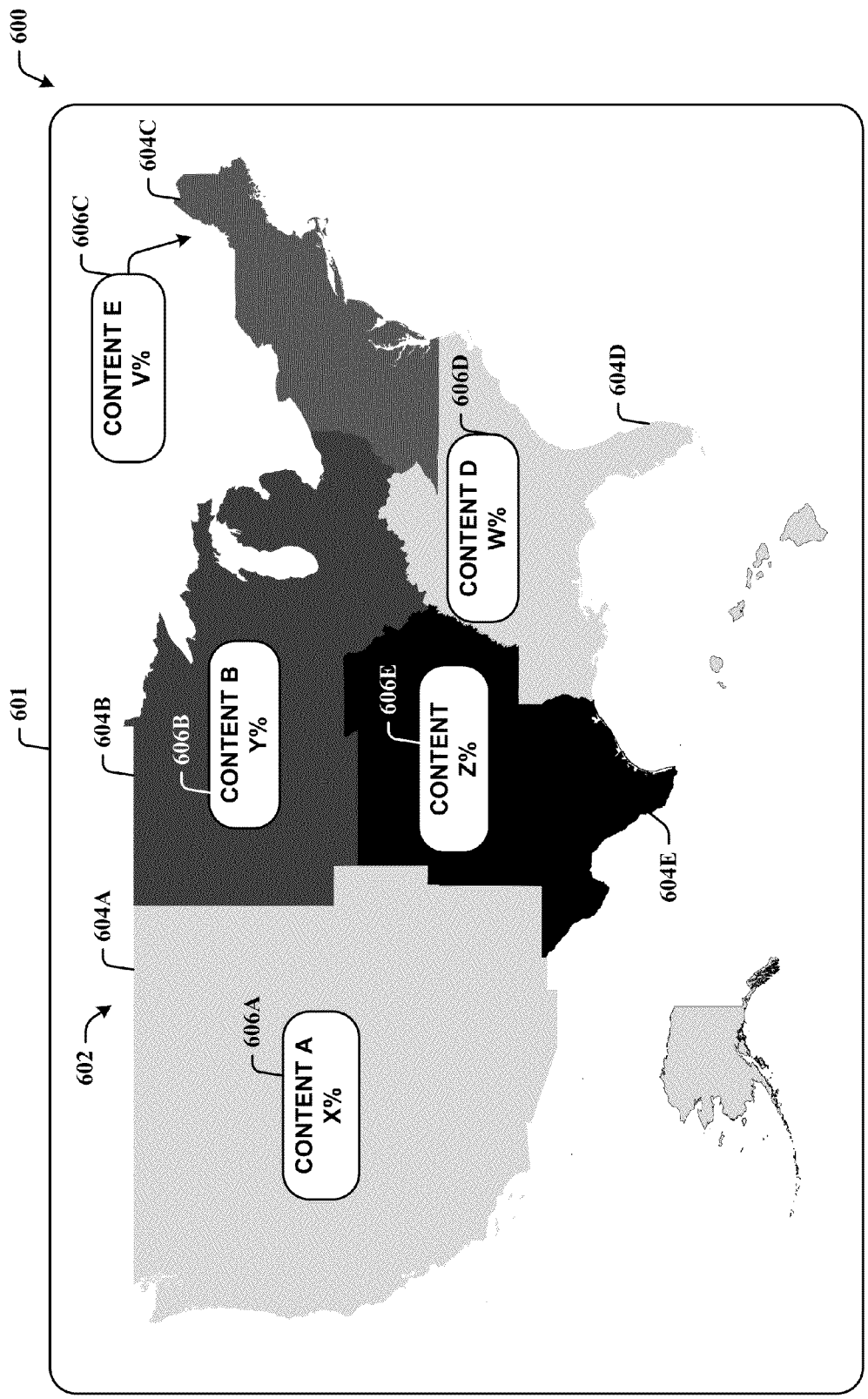
FIG. 6 illustrates a system that provides a non-limiting example display of content consumption by geographic location in accordance with various aspects described in this disclosure.

Non-Limiting Examples of Displaying Content Consumption on a Map and a User Interface Referring to FIG. 6, illustrated is a system 600 that provides a non-limiting example display 601 of content consumption on a map in accordance with various aspects described in this disclosure. The display 601 includes a map 602. The map 602 can be separated, split, or otherwise divided into a set of locations 604 (e.g., 604A-604E). For example, the map 602 can be a map of the United States of America that is divided into five locations (e.g., regions), including a West region 604A, a Midwest region 604B, an East region 604C, a Southeast region 604D, and a Southwest region 604E.

Content consumption can be displayed on the map 602 as a function of respective rankings. For example, content consumption can be displayed on the map 602 based on consumption percentage by location via content consumption indicators 606A-E. The content can include, but is not limited to, songs, movies, television shows, internet videos, websites, video games, applications, online articles, e-books, or online searches. For example, video games having the greatest consumption percentage (e.g., highest ranking) in the respective regions 604A-E can be displayed in the content consumption indicators 606A-E for the respective regions. The content consumption indicators 606A-E can include an identifier of the content (e.g., title, artist, etc.), a consumption percentage by users in the region, and so forth.

It is to be appreciated that multiple consumed contents can be included in the content consumption indicators 606A-E. For example, the content consumption indicators 606 can include a set of five songs (e.g., top five songs) having the greatest consumption percentage in the respective regions. Moreover, the content consumption indicators 606A-E can include virtually any graphical display of content consumption, including, but not limited to, a set of icons, a graph, a heat map representation, a color code, or a set of symbols, and so forth. As discussed, the rankings displayed are based on a subset of consumption characteristics (e.g., filtered consumption characteristics). For example, the consumption characteristics can be filtered based on a type of device (e.g., a smart phone, a cell phone, a tablet, a laptop, a desktop, a portable music player, a video game system, a television, etc.) employed to consume the content, or demographic information associated with the content consumers (e.g., age group, education, gender, etc., if provided by the consumer).

Figure 7:
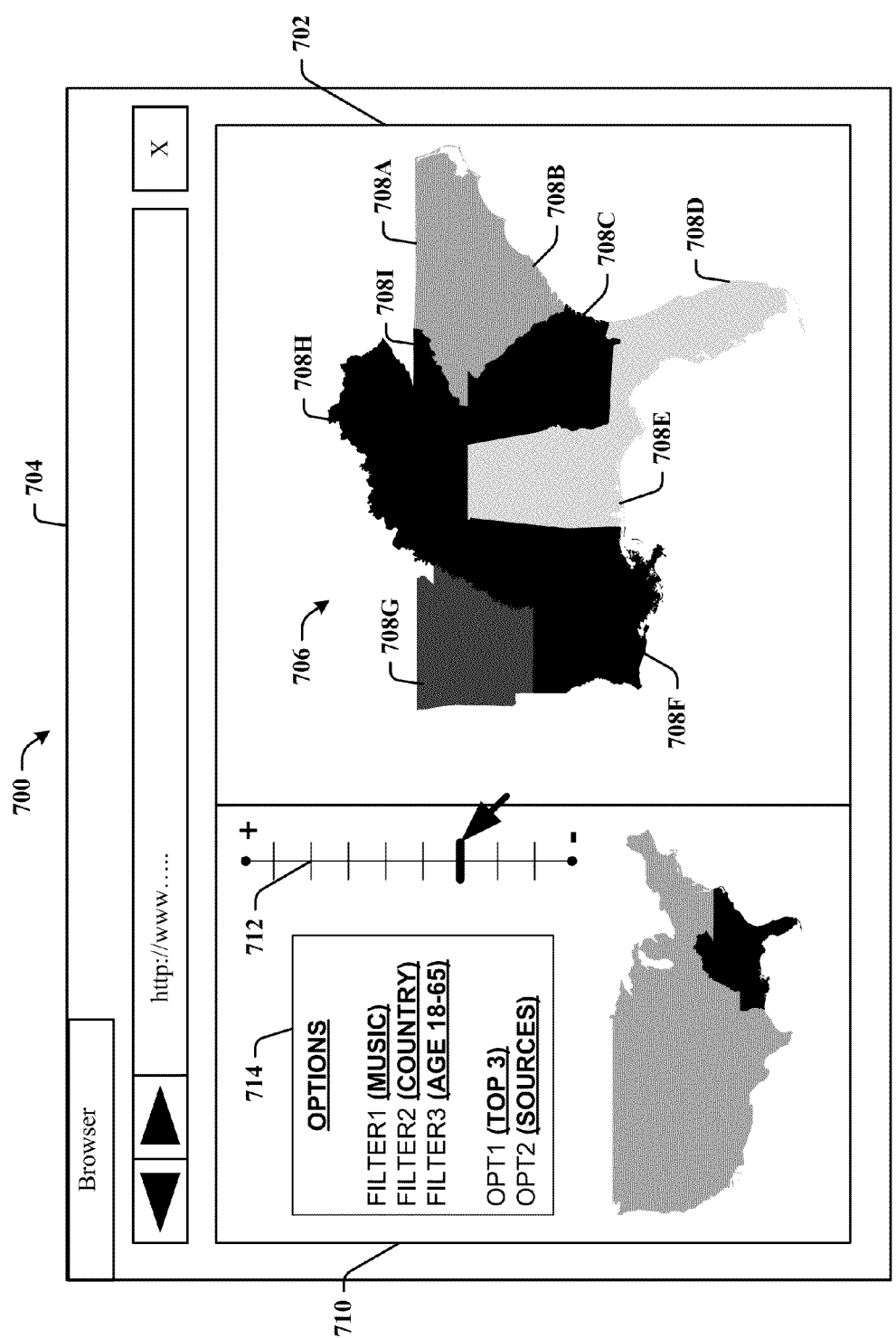
FIG. 7 illustrates a system that that provides a non-limiting example of a user interface for dynamic display of content consumption by geographic location in accordance with various aspects described in this disclosure.

Turning to FIG. 7, illustrated is a system 700 that provides a non-limiting example of a user interface 702 in accordance with various aspects described in this disclosure. The user interface 702 (interface 702) can be displayed via a web browser 704. The user interface 702 can include a map display section 706 that provides for displaying a map of content consumption (e.g., using the display component 110). As discussed, the map can be separated into a set of locations 708 (e.g., states, counties, etc.), and content consumption can be displayed on the map as a function of rankings of one or more content consumption characteristics (e.g., consumption percentage, etc.) for each of the locations 708.

The interface 702 can also include a settings section 710. The settings section 710 provides for a user to set, select, or otherwise determine one or more attributes or settings (e.g., user preferences) for the map display section 706. The settings section 710 can include a zoom selector 712. The zoom selector 712 provides for the user to set or adjust the granularity of display for the map by zooming in or out on the map (e.g., using the zooming component 408). For example, the lowest granularity setting on the zoom selector 712 can be a globe, and the highest granularity setting on the zoom selector 712 can be a set of individuals in the user's network. As an additional example, the user can adjust the granularity by increasing the zoom via the zoom selector 712 from a first granularity, such as a country (e.g., United States) to a second granularity, such as a region of the country (e.g., the Southwest United States).

The interface 702 also includes an options section 714 that provides for the user to set, select, or otherwise determine a set of options for the map display section 706 (e.g., using the preferences component 408). For example, the user can determine one or more filters for ranking the consumed content to be displayed on the map via the options section 714. For instance, the user can set a first filter for a type of consumed content to be displayed (e.g., music), and a second filter for a category of the type content (e.g., country music), and a third filter for content consumption by users having a set of demographic criteria within a threshold range (e.g., age range). As an additional example, the set of options in the options section 714 can include a set of display options. For instance, the user can set a first display option (e.g., display option 1) to display a set of three songs (e.g., top 3) for each location (e.g., 708A-7081) having the greatest consumption percentage (e.g., highest ranking) in the respective locations, and a second display option (e.g., display option 2) to display a set of sources (e.g., stores, websites, online content services, etc.) for acquiring the displayed content.

Figure 8:
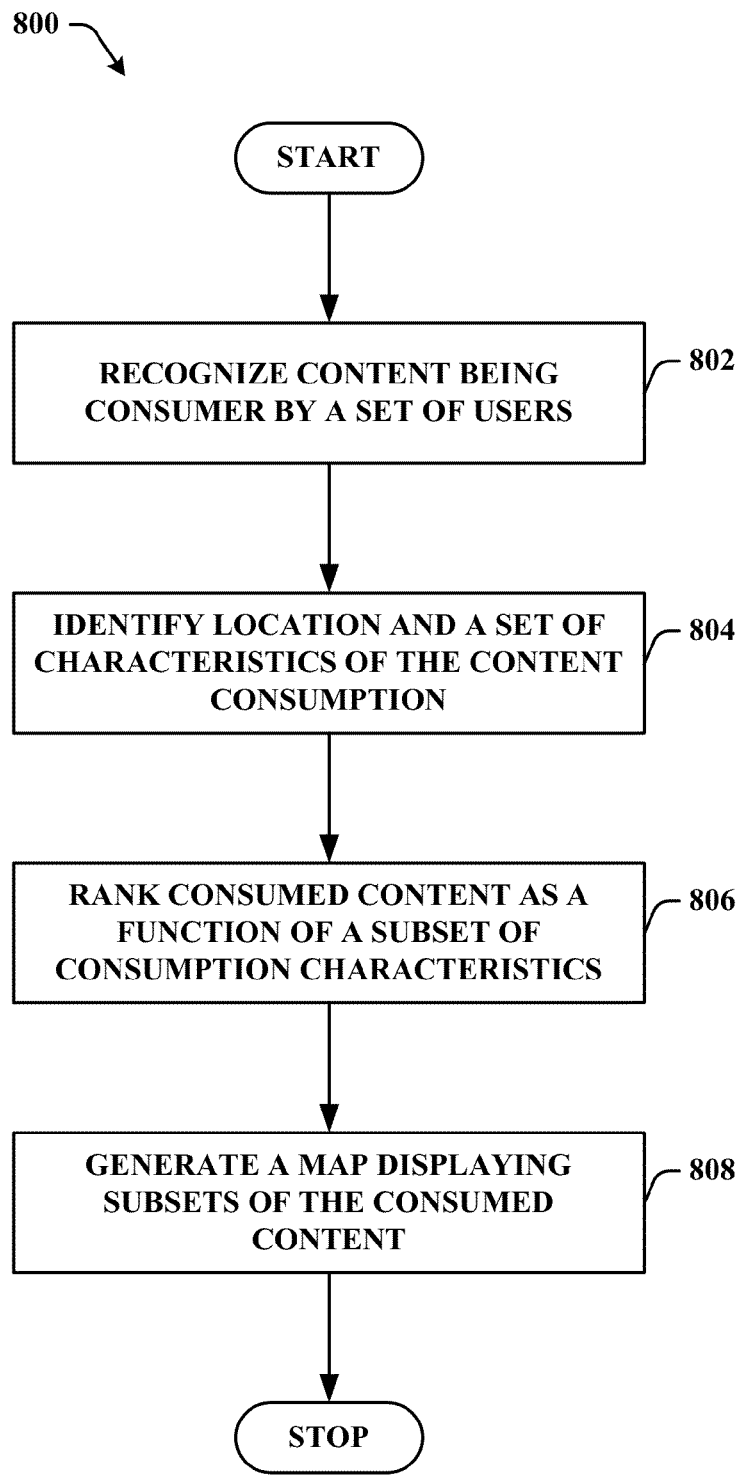
FIGS. 8-9 are example flow diagrams of receptive methods for dynamic display of content consumption by geographic location in accordance with various aspects described in this disclosure.
Figure 9:
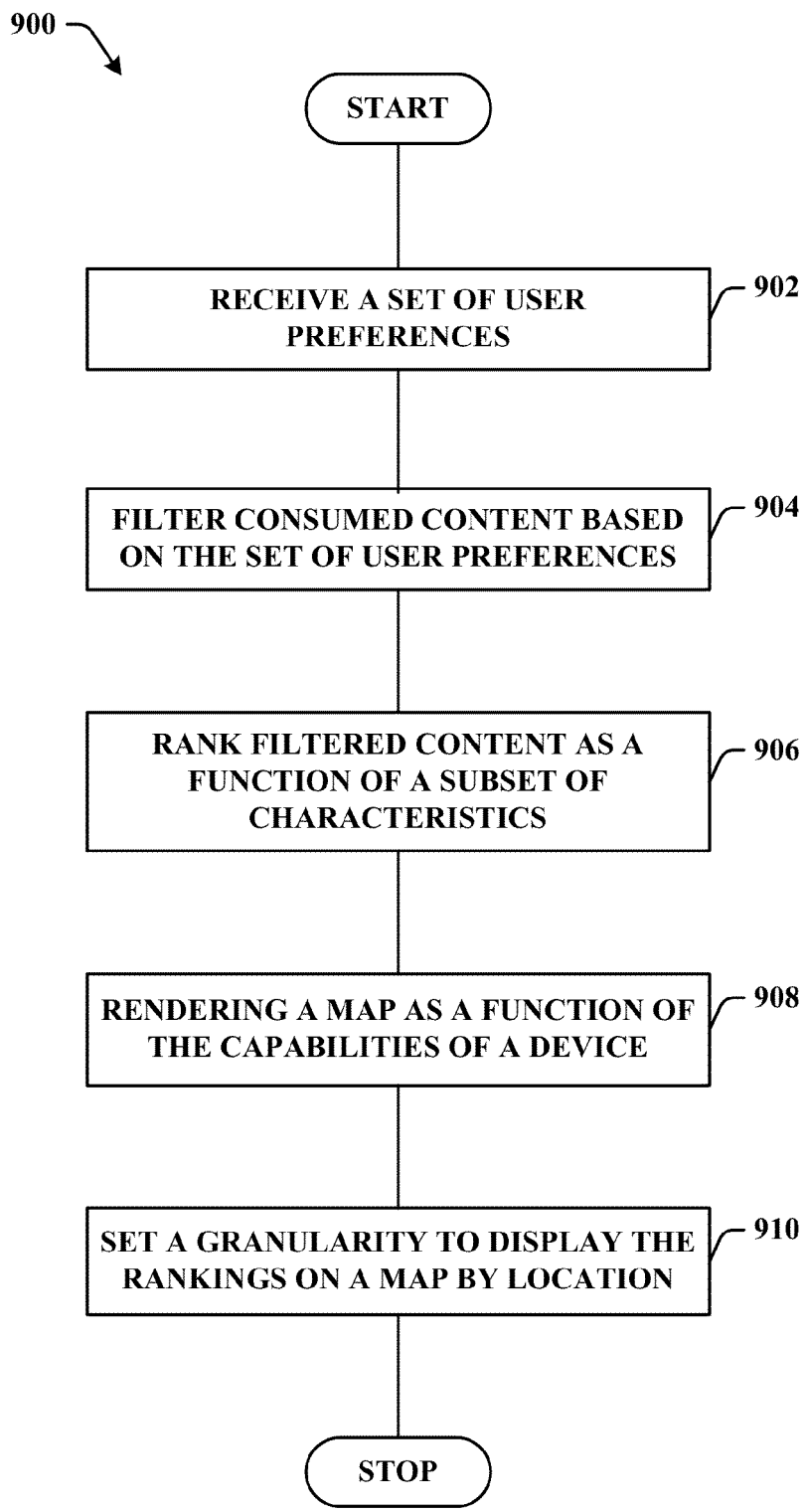

Non-Limiting Examples of Methods for Dynamic Display of Content Consumption by Geographic Location FIGS. 8-9 illustrate various methodologies in accordance with the disclosed subject matter. While, for purposes of simplicity of explanation, the methodologies are shown and described as a series of acts, the disclosed subject matter is not limited by the order of acts, as some acts may occur in different orders and/or concurrently with other acts from that shown and described in this disclosure. For example, those skilled in the art will understand and appreciate that a methodology can alternatively be represented as a series of interrelated states or events, such as in a state diagram. Moreover, not all illustrated acts may be required to implement a methodology in accordance with the disclosed subject matter. Additionally, it is to be appreciated that the methodologies disclosed in this disclosure are capable of being stored on an article of manufacture to facilitate transporting and transferring such methodologies to computers or other computing devices.

Referring now to FIG. 8, illustrated is an example methodology 800 for dynamic display of content consumption by geographic location in accordance with various aspects described in this disclosure. At reference numeral 802, content consumed by a set of users is recognized (e.g., using the recognition component 106). The content can include, but is not limited to, songs, movies, television shows, internet videos, websites, video games, applications, online articles, electronic books (e-books), or online searches. Users can employ virtually any content enabled device to recognize consumed content and/or consume content, including but not limited to a smart phone, a cell phone, a personal digital assistant (PDA), a tablet, a laptop, a desktop, a portable music player, a video game system, an electronic reader (e-reader), a television, and so forth, and the user can permit the device to transmit their consumption to the recognition component 106 for recognition and use in accordance with this disclosure. For example, in one embodiment, content consumed using a device can be recognized based on metadata associated with the consumed content obtained from the device (e.g., using the acquisition component 302). As an additional or alternative example, in one embodiment, content consumed using a separate device can be captured using the device (e.g., using the recognition app 204), and the consumed content can be identified based on a comparison of the consumed content, or a fingerprint of the consumed content, with known content (e.g., using the matching component 312).

At reference numeral 804, a geographic location and a set of characteristics of the content consumption are identified (e.g., using the recognition component 106). The set of characteristics of the consumption (consumption characteristics) can include virtually any data related to users consuming the content, or to the consumption of the content, as permitted by the users. For example, the set of consumption characteristics can include a frequency of consumption of respective content by the set of users, devices used to consume content, applications used to consume content, times of the content consumption, demographic information associated with respective users consuming content, and so forth.

At reference numeral 806, the consumed content is ranked as a function of a subset of the consumption characteristics (e.g., using the aggregation component 108 or ranking component 304). For example, when location data is available, respective consumed content can be ranked, by location, as a function of a consumption percentage. For instance, if a first song is consumed by 45% of the set of users in a first location (e.g., in the West region 604A), and a second song is consumed by 11% of the set of users in the first location, then the first song can be ranked ahead of, or higher than, the second song for the first location based on the first and second songs' respective percentages of consumption (e.g., 45% and 10%) at the first location. At reference numeral 808, a map displaying subsets of the consumed content, or data associated with the subsets of consumed content, is generated (e.g., using the display component 110) as function of respective rankings and geographic location. For example, a map can be generated displaying the most popular (e.g., highest ranked or highest consumption percentage) songs for a set of locations included on the map. The map can be generated in real-time, e.g., in response to receiving updated user preferences.

Referring now to FIG. 9, illustrated is an example methodology 900 for dynamic display of content consumption by geographic location in accordance with various aspects described in this disclosure. At reference numeral 902, a set of user preferences are received (e.g., using the preferences component 408) regarding the consumed content and/or consumption characteristics. For example, a user preference to rank content having a predetermined classification (e.g., country songs, horror movies, etc.) as a function of respective percentages of consumption by a set of users (e.g., a set of anonymized users) in a predetermined location (e.g., United States, Japan, etc.) can be received. As an additional example, a user preference defining a set of social networking friends (e.g., other users) for whom a user desires to display consumption as a function of frequency of consumption can be received. The user preferences can relate to virtually any characteristic of content consumption or content consumers permitted by users.

At reference numeral 904, consumed content is filtered based on the set of user preferences (e.g., using the filter component 402). For example, consumed content not having a predetermined classification (e.g., music, country music, movies, novels, etc.) can be separated, filtered, or otherwise not included in a set of filtered consumed content (e.g., filtered content or a subset of consumed content). At reference numeral 906, the set of filtered content is ranked based on a subset of consumption characteristics (e.g., using the ranking component 404). The subset of consumption characteristics employed in ranking the filtered content can be based in part on the set of user preferences. For instance, the user preferences can include ranking consumed content based on respective percentages of consumption for a set of locations (e.g., regions in a country, cities in a region, etc.).

At reference numeral 908, a map displaying a subset of the filtered content as a function of the ranking is rendered based on the capabilities of a device (e.g., using the rendering component 504). For example, the device employed can be a smart phone or other mobile device, wherein the mobile device may have a screen that is smaller than a screen for a desktop computer, and the map can be rendered based on the capabilities or dimensions of the mobile device.

At reference numeral 910, a granularity of display for the filtered content can be set or adjusted (e.g., using the zooming component 508). The granularity displayed can include a globe, a continent, a country, a region, a state, a city, a subset set of users, and so forth. For example, the map can be a map of the world displaying consumed content as a function of consumption percentage by continent, and the granularity displayed can be adjusted by zooming in at a country on the map.

Exemplary Networked and Distributed Environments

One of ordinary skill in the art can appreciate that the various embodiments described in this disclosure can be implemented in connection with any computer or other client or server device, which can be deployed as part of a computer network or in a distributed computing environment, and can be connected to any kind of data store where media may be found. In this regard, the various embodiments described in this disclosure can be implemented in any computer system or environment having any number of memory or storage units, and any number of applications and processes occurring across any number of storage units. This includes, but is not limited to, an environment with server computers and client computers deployed in a network environment or a distributed computing environment, having remote or local storage.

Distributed computing provides sharing of computer resources and services by communicative exchange among computing devices and systems. These resources and services include the exchange of information, cache storage and disk storage for objects, such as files. These resources and services also include the sharing of processing power across multiple processing units for load balancing, expansion of resources, specialization of processing, and the like. Distributed computing takes advantage of network connectivity, allowing clients to leverage their collective power to benefit the entire enterprise. In this regard, a variety of devices may have applications, objects or resources that may participate in various embodiments of this disclosure.

Figure 10:
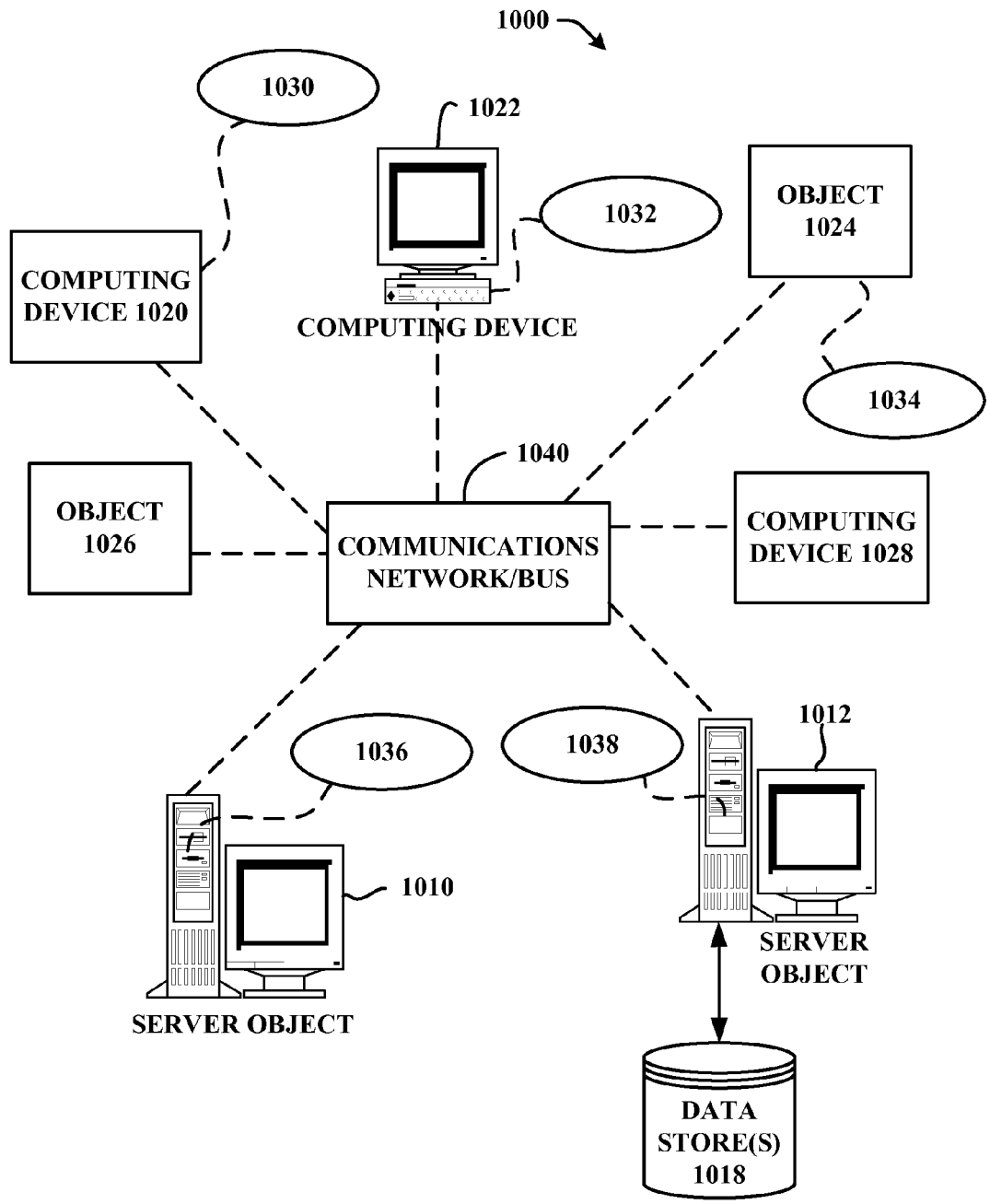
FIG. 10 is a block diagram representing an exemplary non-limiting networked environment in which the various embodiments can be implemented.

FIG. 10 provides a schematic diagram of an exemplary networked or distributed computing environment. The distributed computing environment comprises computing objects 1010, 1012, etc. and computing objects or devices 1018, 1020, 1022, 1024, 1026, 1028, etc., which may include programs, methods, data stores, programmable logic, etc., as represented by applications 1030, 1032, 1034, 1036, 1038. It can be appreciated that computing objects 1010, 1012, etc. and computing objects or devices 1018, 1020, 1022, 1024, 1026, 1028, etc. may comprise different devices, such as personal data assistants (PDAs), audio/video devices, mobile phones, MP3 players, personal computers, tablets, laptops, etc.

Each computing object 1010, 1012, etc. and computing objects or devices 1018, 1020, 1022, 1024, 1026, 1028, etc. can communicate with one or more other computing objects 1010, 1012, etc. and computing objects or devices 1018, 1020, 1022, 1024, 1026, 1028, etc. by way of the communications network 1040, either directly or indirectly. Even though illustrated as a single element in FIG. 10, network 1040 may comprise other computing objects and computing devices that provide services to the system of FIG. 10, and/or may represent multiple interconnected networks, which are not shown. Each computing object 1010, 1012, etc. or computing objects or devices 1018, 1020, 1022, 1024, 1026, 1028, etc. can also contain an application, such as applications 1030, 1032, 1034, 1036, 1038, that might make use of an API, or other object, software, firmware and/or hardware, suitable for communication with or implementation of various embodiments of this disclosure.

There are a variety of systems, components, and network configurations that support distributed computing environments. For example, computing systems can be connected together by wired or wireless systems, by local networks or widely distributed networks. Currently, many networks are coupled to the Internet, which provides an infrastructure for widely distributed computing and encompasses many different networks, though any network infrastructure can be used for exemplary communications made incident to the systems as described in various embodiments.

Thus, a host of network topologies and network infrastructures, such as client/server, peer-to-peer, or hybrid architectures, can be employed. The "client" is a member of a class or group that uses the services of another class or group to which it is not related. A client can be a process, e.g., roughly a set of instructions or tasks, that requests a service provided by another program or process. The client may be or use a process that utilizes the requested service without having to "know" any working details about the other program or the service itself.

In a client/server architecture, particularly a networked system, a client is usually a computer that accesses shared network resources provided by another computer, e.g., a server. In the illustration of FIG. 10, as a non-limiting example, computing objects or devices 1018, 1020, 1022, 1024, 1026, 1028, etc. can be thought of as clients and computing objects 1010, 1012, etc. can be thought of as servers where computing objects 1010, 1012, etc. provide data services, such as receiving data from client computing objects or devices 1018, 1020, 1022, 1024, 1026, 1028, etc., storing of data, processing of data, transmitting data to client computing objects or devices 1018, 1020, 1022, 1024, 1026, 1028, etc., although any computer can be considered a client, a server, or both, depending on the circumstances.

A server is typically a remote computer system accessible over a remote or local network, such as the Internet or wireless network infrastructures. The client process may be active in a first computer system, and the server process may be active in a second computer system, communicating with one another over a communications medium, thus providing distributed functionality and allowing multiple clients to take advantage of the information-gathering capabilities of the server.

In a network environment in which the communications network/bus 1040 is the Internet, for example, the computing objects 1010, 1012, etc. can be Web servers with which the client computing objects or devices 1018, 1020, 1022, 1024, 1026, 1028, etc. communicate via any of a number of known protocols, such as the hypertext transfer protocol (HTTP). Objects 1010, 1012, etc. may also serve as client computing objects or devices 1018, 1020, 1022, 1024, 1026, 1028, etc., as may be characteristic of a distributed computing environment.

Exemplary Computing Device

As mentioned, advantageously, the techniques described in this disclosure can be applied to any device suitable for implementing various embodiments described in this disclosure. Handheld, portable and other computing devices and computing objects of all kinds are contemplated for use in connection with the various embodiments, e.g., anywhere that a device may wish to read or write transactions from or to a data store. Accordingly, the below general purpose remote computer described below in FIG. 11 is but one example of a computing device.

Although not required, embodiments can partly be implemented via an operating system, for use by a developer of services for a device or object, and/or included within application software that operates to perform one or more functional aspects of the various embodiments described in this disclosure. Software may be described in the general context of computer executable instructions, such as program modules, being executed by one or more computers, such as client workstations, servers or other devices. Those skilled in the art will appreciate that computer systems have a variety of configurations and protocols that can be used to communicate data, and thus, no particular configuration or protocol is to be considered limiting.

Figure 11:
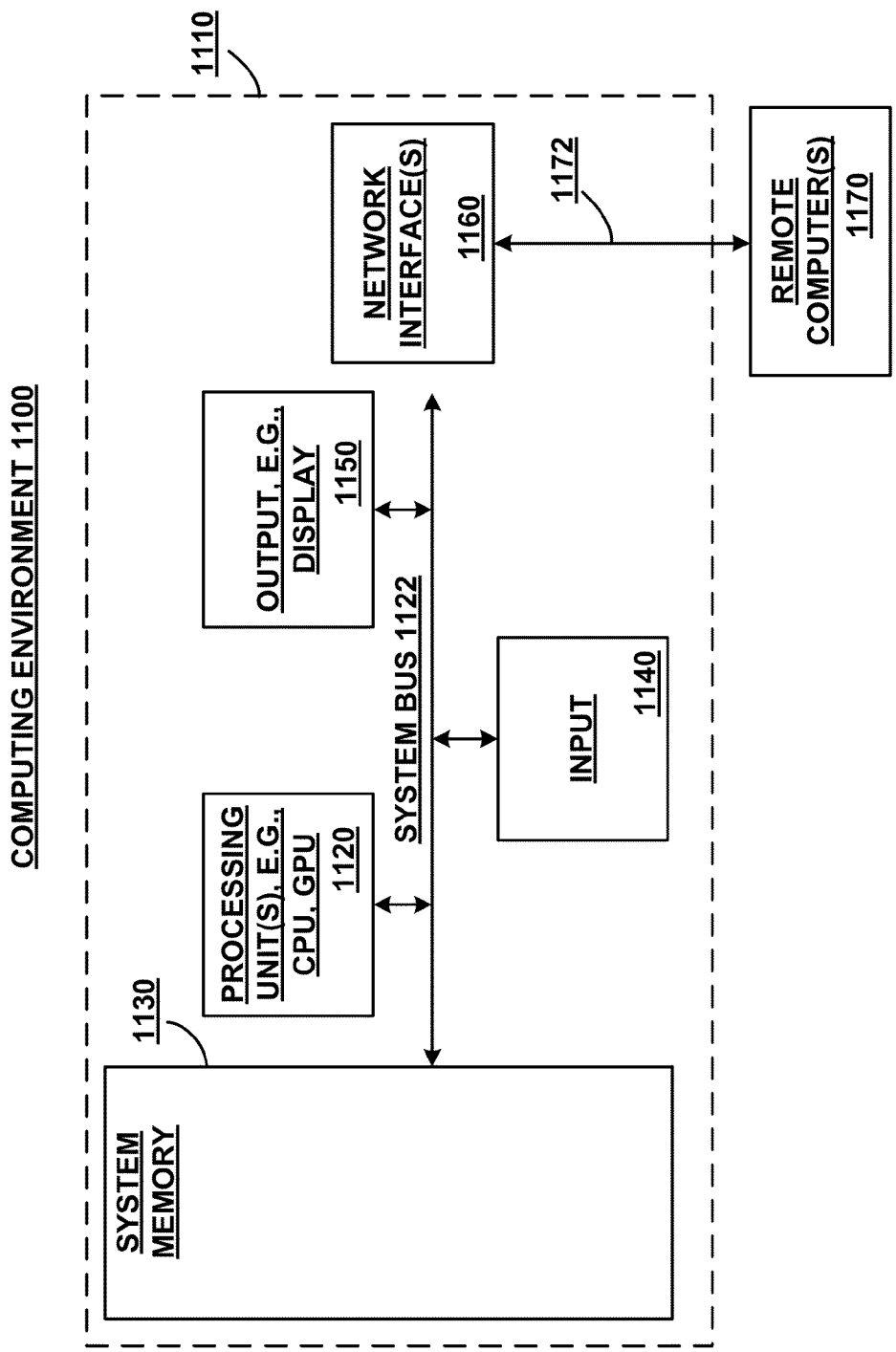
FIG. 11 is a block diagram representing an exemplary non-limiting computing system or operating environment in which the various embodiments may be implemented.

FIG. 11 thus illustrates an example of a suitable computing system environment 1100 in which one or aspects of the embodiments described in this disclosure can be implemented, although as made clear above, the computing system environment 1100 is only one example of a suitable computing environment and is not intended to suggest any limitation as to scope of use or functionality. Neither is the computing environment 1100 be interpreted as having any dependency or requirement relating to any one or combination of components illustrated in the exemplary operating environment 1100.

With reference to FIG. 11, an exemplary remote device for implementing one or more embodiments includes a general purpose computing device in the form of a computer 1110. Components of computer 1110 may include, but are not limited to, a processing unit 1120, a system memory 1130, and a system bus 1122 that couples various system components including the system memory to the processing unit 1120.

Computer 1110 includes a variety of computer readable media and can be any available media that can be accessed by computer 1110. The system memory 1130 may include computer storage media in the form of volatile and/or nonvolatile memory such as read only memory (ROM) and/or random access memory (RAM). By way of example, and not limitation, memory 1130 may also include an operating system, application programs, other program modules, and program data.

A user can enter commands and information into the computer 1110 through input devices 1140. A monitor or other type of display device is also connected to the system bus 1122 via an interface, such as output interface 1150. In addition to a monitor, computers can also include other peripheral output devices such as speakers and a printer, which may be connected through output interface 1150.

The computer 1110 may operate in a networked or distributed environment using logical connections to one or more other remote computers, such as remote computer 1170 via network interface 1160. The remote computer 1170 may be a personal computer, a server, a router, a network PC, a peer device or other common network node, or any other remote media consumption or transmission device, and may include any or all of the elements described above relative to the computer 1110. The logical connections depicted in FIG. 11 include a network 1172, such local area network (LAN) or a wide area network (WAN), but may also include other networks/buses. Such networking environments are commonplace in homes, offices, enterprise-wide computer networks, intranets and the Internet.

As mentioned above, while exemplary embodiments have been described in connection with various computing devices and network architectures, the underlying concepts may be applied to any network system and any computing device or system in which it is desirable to publish or consume content in a flexible way.

The word "exemplary" is used in this disclosure to mean serving as an example, instance, or illustration. For the avoidance of doubt, this matter disclosed in this disclosure is not limited by such examples. In addition, any aspect or design described in this disclosure as "exemplary" is not necessarily to be construed as preferred or advantageous over other aspects or designs, nor is it meant to preclude equivalent exemplary structures and techniques known to those of ordinary skill in the art. Furthermore, to the extent that the terms "includes," "has," "contains," and other similar words are used in either the detailed description or the claims, for the avoidance of doubt, such terms are intended to be inclusive in a manner similar to the term "comprising" as an open transition word without precluding any additional or other elements.

Computing devices typically include a variety of media, which can include computer-readable storage media. Computer-readable storage media can be any available storage media that can be accessed by the computer, is typically of a non-transitory nature, and can include both volatile and nonvolatile media, removable and non-removable media. By way of example, and not limitation, computer-readable storage media can be implemented in connection with any method or technology for storage of information such as computer-readable instructions, program modules, structured data, or unstructured data. Computer-readable storage media can include, but are not limited to, RAM, ROM, EEPROM, flash memory or other memory technology, CD-ROM, digital versatile disk (DVD) or other optical disk storage, magnetic cassettes, magnetic tape, magnetic disk storage or other magnetic storage devices, or other tangible and/or non-transitory media which can be used to store desired information. Computer-readable storage media can be accessed by one or more local or remote computing devices, e.g., via access requests, queries or other data retrieval protocols, for a variety of operations with respect to the information stored by the medium.

As mentioned, the various techniques described in this disclosure may be implemented in connection with hardware or software or, where appropriate, with a combination of both. As used in this disclosure, the terms "component," "system" and the like are likewise intended to refer to a computer-related entity, either hardware, a combination of hardware and software, software, or software in execution. For example, a component may be, but is not limited to being, a process running on a processor, a processor, an object, an executable, a thread of execution, a program, and/or a computer. By way of illustration, both an application running on computer and the computer can be a component. One or more components may reside within a process and/or thread of execution and a component may be localized on one computer and/or distributed between two or more computers. Further, a "device" can come in the form of specially designed hardware; generalized hardware made specialized by the execution of software thereon that enables the hardware to perform specific function (e.g., coding and/or decoding); software stored on a computer readable medium; or a combination thereof.

The aforementioned systems have been described with respect to interaction between several components. It can be appreciated that such systems and components can include those components or specified sub-components, some of the specified components or sub-components, and/or additional components, and according to various permutations and combinations of the foregoing. Sub-components can also be implemented as components communicatively coupled to other components rather than included within parent components (hierarchical). Additionally, it is to be noted that one or more components may be combined into a single component providing aggregate functionality or divided into several separate sub-components, and that any one or more middle layers, such as a management layer, may be provided to communicatively couple to such sub-components in order to provide integrated functionality. Any components described in this disclosure may also interact with one or more other components not specifically described in this disclosure but generally known by those of skill in the art.

In view of the exemplary systems described above, methodologies that may be implemented in accordance with the described subject matter will be better appreciated with reference to the flowcharts of the various figures. While for purposes of simplicity of explanation, the methodologies are shown and described as a series of blocks, the claimed subject matter is not limited by the order of the blocks, as some blocks may occur in different orders and/or concurrently with other blocks from what is depicted and described in this disclosure. Where non-sequential, or branched, flow is illustrated via flowchart, it can be appreciated that various other branches, flow paths, and orders of the blocks, may be implemented which achieve the same or a similar result. Moreover, not all illustrated blocks may be required to implement the methodologies described hereinafter.

In addition to the various embodiments described in this disclosure, it is to be understood that other similar embodiments can be used or modifications and additions can be made to the described embodiment(s) for performing the same or equivalent function of the corresponding embodiment(s) without deviating there from. Still further, multiple processing chips or multiple devices can share the performance of one or more functions described in this disclosure, and similarly, storage can be affected across a plurality of devices. Accordingly, the invention is not to be limited to any single embodiment, but rather can be construed in breadth, spirit and scope in accordance with the appended claims.

What is claimed is:

1. A system, comprising:
  a memory storing computer executable components; and
  a processor that executes the following computer executable components stored in the memory:
    a recognition component that recognizes content being consumed by a set of users, and that identifies geographic locations of the consumption by the set of users and a set of consumption characteristics of the consumption by the set of users, wherein the set of consumption characteristics includes respective types of devices employed for the consumption by the set of users;

a classifier that determines at least one filter for a user of the set of users, wherein the at least one filter includes a type of device employed for the consumption by the set of users;

an aggregation component that:
filters the set of consumption characteristics based upon the at least one filter that includes the type of device employed for the consumption by the set of users to produce a subset of the consumption characteristics, and ranks respective consumed content as a function of the subset of the consumption characteristics and the set of filters; and a display component that generates a map displaying subsets of the consumed content as a function of respective rankings and geographic location.

2. The system of claim 1, wherein the set of consumption characteristics includes at least one of frequency of consumption applications associated with the consumption, or a set of demographic data associated with the set of users.

3. The system of claim 1, wherein the at least one filter further includes a time period for the consumption.

4. The system of claim 1, wherein the consumed content includes at least one of songs, movies, television shows, internet videos, websites, video games, applications, online articles, electronic books, or online searches.

5. The system of claim 1, wherein the aggregation component further comprises a filter component that filters at least one of consumed content to be ranked or the subset of the consumption characteristics employed in the ranking based on the at least one filter.

6. The system of claim 1, wherein the recognition component recognizes the content being consumed based upon ambient sound detected by at least one device employed by at least one user of the set of users.

7. The system of claim 1, wherein the at least one filter further includes respective percentages of the set of users that consumed respective consumed content.

8. The system of claim 1, further comprising an archive component that maintains historical maps of subsets of consumed content.

9. The system of claim 1, wherein the display component generates the map as a custom map based on display capabilities of a device associated with the user.

10. The system of claim 1, wherein the recognition component further comprises a matching component that compares at least one of consumed content or a fingerprint of consumed content to a set of known content, and recognizes, based on the comparison, the consumed content.

11. The system of claim 1, wherein the at least one filter further includes a filter created by at least one other user of the set of users and shared with the user.

12. A method, comprising:
recognizing, by a system including a processor, content being consumed by a set of users;
identifying, by the system, a geographic location associated with the content being consumed by the set of users and a set of content consumption characteristics of the content being consumed by the set of users, wherein the set of consumption characteristics includes respective types of devices employed for the consumption by the set of users;

determining, by the system, at least one filter for a user of the set of users, wherein the at least one filter includes a type of device employed for the consumption by the set of users;

filtering, by the system, the set of consumptions characteristics based upon the at least one filter that includes the type of device to produce a subset of the consumption characteristics;

ranking, by the system, respective consumed content as a function of the subset of the content consumption characteristics; and generating, by the system, a map displaying subsets of the consumed content as a function of respective rankings and geographic location.

13. The method of claim 12, wherein the identifying the set of content consumption characteristics includes identifying at least one of frequency of consumption, or applications associated with the consumption.

14. The method of claim 12, wherein the at least one filter further includes a time period for the consumption.

15. The method of claim 12, wherein the recognizing is based upon ambient sound detected by at least one device employed by at least one user of the set of users.

16. The method of claim 12, wherein the at least one filter further includes respective percentages of the set of users that consumed respective consumed content.

17. The method of claim 12, wherein the at least one filter further includes a filter created by at least one other user of the set of users and shared with the user.

18. A non-transitory computer-readable medium having instructions stored thereon that, in response to execution, cause a system including a processor to:
receive a request regarding consumption of content in one or more geographic areas for a set of users;
recognize the consumption of content in the one or more geographic areas for the set of users and a set of consumption characteristics of the consumption of the content by the set of users, wherein the set of consumption characteristics includes respective types of devices employed for the consumption by the set of users;
determine at least one filter for a user of the set of users, wherein the at least one filter includes a type of device employed for the consumption by the set of users;
filter the set of consumptions characteristics based upon the at least one filter that includes the type of device, to produce a subset of the consumption characteristics;
rank subsets of the consumed content as a function of the subset of the consumption characteristics; and
generate a map displaying the subsets of consumed content as a function of respective rankings of the subsets of consumed content and geographic location of respective consumption.

19. The non-transitory computer-readable medium of claim 18, wherein the request is regarding consumption of at least one of songs, movies, television shows, internet videos, websites, video games, applications, online articles, electronic books, or online searches.

20. The non-transitory computer-readable medium of claim 18, wherein the at least one filter further includes a time period for the consumption.

21. The non-transitory computer-readable medium of claim 18, wherein the recognizing is based upon ambient sound detected by at least one device employed by at least one user of the set of users.

22. The non-transitory computer-readable medium of claim 18, wherein the at least one filter further includes respective percentages of the set of users that consumed respective consumed content.

23. The non-transitory computer-readable medium of claim 18, wherein the at least one filter further includes a filter created by at least one other user of the set of users and shared with the user.

* * * * *